(12) United States Patent
Li et al.

(10) Patent No.: US 11,681,672 B2
(45) Date of Patent: Jun. 20, 2023

(54) VIRTUAL DATABASE RESOURCE USAGE

(71) Applicant: International Business Machines Corporation, Armonk, NY (US)

(72) Inventors: Shuo Li, Beijing (CN); Xiaobo Wang, Haidian District (CN); Sheng Yan Sun, BeiJing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 17/217,464

(22) Filed: Mar. 30, 2021

(65) Prior Publication Data

US 2022/0318214 A1   Oct. 6, 2022

(51) Int. Cl.
*G06F 16/21* (2019.01)
*G06F 16/22* (2019.01)
*G06F 11/36* (2006.01)
*G06F 16/27* (2019.01)

(52) U.S. Cl.
CPC ........ *G06F 16/217* (2019.01); *G06F 11/3612* (2013.01); *G06F 16/22* (2019.01); *G06F 16/27* (2019.01)

(58) Field of Classification Search
CPC ........ G06F 16/217; G06F 16/27; G06F 16/22; G06F 11/3612
See application file for complete search history.

(56) References Cited

U.S. PATENT DOCUMENTS

| | | | |
|---|---|---|---|
| 7,805,706 B1 * | 9/2010 | Ly | G06F 9/5083 717/124 |
| 9,111,022 B2 | 8/2015 | Kraft et al. | |
| 9,311,376 B2 | 4/2016 | Narasayya et al. | |
| 9,330,119 B2 * | 5/2016 | Chan | G06F 16/285 |
| 9,710,501 B2 * | 7/2017 | Walker | G06F 16/217 |
| 10,089,219 B1 * | 10/2018 | Bates | H04L 41/145 |
| 10,275,357 B2 * | 4/2019 | Choi | G06F 12/0897 |

(Continued)

OTHER PUBLICATIONS

Mell, P. et al., "The NIST Definition of Cloud Computing", Recommendations of the National Institute of Standards and Technology, NIST Special Publication 800-145, 7 pages, Sep. 2011.

*Primary Examiner* — Huawen A Peng
(74) *Attorney, Agent, or Firm* — Mark Bergner

(57) ABSTRACT

A computer implemented system and method allow database performance testing and improvement. The method comprises using a database system (DBS) for embedding a virtual resource simulation system (VRSS) into a node of the DBS, loading a new configuration parameter of a database into the VRSS, receiving, by the VRSS from the DBS, an action control block (ACB), and dynamically activating and assigning a service task by a service task dispatcher of the VRSS to process the ACB. The method further comprises simulating a process of database execution based on a content of the ACB by creating a limited database internal data structure that is based on the ACB and the new configuration parameter, and manipulating the limited database internal structure to produce a simulation result. The method further comprises utilizing a metric associated with the simulation result of the new configuration parameter in the simulated process of database execution.

20 Claims, 20 Drawing Sheets

(56) References Cited

U.S. PATENT DOCUMENTS

| | | | |
|---|---|---|---|
| 10,311,703 B1* | 6/2019 | Hayzen | G06F 16/21 |
| 2008/0133212 A1 | 6/2008 | Krishnamurthy et al. | |
| 2008/0263044 A1* | 10/2008 | Cantrill | G06F 11/3636 |
| 2011/0022586 A1 | 1/2011 | Wilkinson et al. | |
| 2011/0288847 A1 | 11/2011 | Narayanan et al. | |
| 2016/0239582 A1* | 8/2016 | Schechter | G06F 16/24542 |
| 2017/0153968 A1* | 6/2017 | Georgiev | G06F 16/211 |
| 2017/0272533 A1* | 9/2017 | Pekar | H04L 67/5682 |
| 2020/0293503 A1* | 9/2020 | P | G06N 5/04 |
| 2020/0394178 A1* | 12/2020 | Taggar | G06F 16/2379 |
| 2021/0004357 A1* | 1/2021 | Bagchi | G06F 16/21 |
| 2021/0200765 A1* | 7/2021 | Sahu | G06F 16/24532 |

* cited by examiner

| BP16K1 READ OPERATIONS | QUANTITY | /SECOND |
|---|---|---|
| BPOOL HIT RATIO (%) | 57.19 | |
| BPOOL HIT RATIO (%) SEQU | 22.03 | |
| BPOOL HIT RATIO (%) RANDOM | 68.99 | |
| GETPAGE REQUEST | 188.6M | 19.8K |
|   GETPAGE REQS-SEQUENTIAL | 24459.6K | 2563.92 |
|     IN-MEM OVFL SEQ REQS | N/A | N/A |
|   GETPAGE REQS-RANDOM | 164.2M | 17.2K |
|     IN-MEM OVFL RND REQS | N/A | N/A |
| SYNCHRONOUS READS | 50908.5K | 5336.35 |
|   SYNC READS-SEQUENTIAL | 19453.00 | 2.04 |
|     IN-MEM OVFL SEQ READS | N/A | N/A |
|   SYNC READS-RANDOM | 50889.1K | 5334.31 |
|     IN-MEM OVFL RND READS | N/A | N/A |
| GETPAGE PER SYN.READ-RANDOM | 3.23 | |
| SEQUENTIAL PREFETCH REQUEST | 809.0K | 84.81 |
| SEQUENTIAL PREFETCH READS | 770.7K | 80.79 |
| PAGES READ VIA SEQ.PREFETCH | 24607.0K | 2579.37 |
| S.PRF.PAGES READ/S.PRF.READ | 31.93 | |
| LIST PREFETCH REQUESTS | 0.00 | 0.00 |
| LIST PREFETCH READS | 0.00 | 0.00 |
| PAGES READ VIA LIST PREFTCH | 0.00 | 0.00 |
| L.PRF.PAGES READ/L.PRF.READ | N/C | |
| DYNAMIC PREFETCH REQUESTED | 3511.6K | 368.10 |
| DYNAMIC PREFETCH READS | 1841.0K | 192.98 |
| PAGES READ VIA DYN.PREFETCH | 5240.1K | 549.28 |
| D.PRF.PAGES READ/D.PRF.READ | 2.85 | |
| PREF.DISABLED-NO BUFFER | 0.00 | 0.00 |
| PREF.DISABLED-NO READ ENG | 0.00 | 0.00 |
| PAGE-INS REQUIRED FOR READ | 0.00 | 0.00 |

FIG. 14A

| BP16K1 WRITE OPERATIONS | QUANTITY | /SECOND |
|---|---|---|
| BUFFER UPDATES | 96458.0K | 10.1K |
| PAGES WRITTEN | 0.00 | 0.00 |
| BUFF.UPDATES/PAGES WRITTEN | N/C | |
| | | |
| SYNCHRONOUS WRITES | 0.00 | 0.00 |
| ASYNCHRONOUS WRITES | 0.00 | 0.00 |
| PAGES WRITTEN PER WRITE I/O | N/C | |
| PAGES WRTN FOR CASTOUT I/O | 72158.9K | 7563.87 |
| NUMBER OF CASTOUT I/O | 6687.4K | 700.99 |
| | | |
| HORIZ.DEF.WRITE THRESHOLD | 0.00 | 0.00 |
| VERTI.DEF.WRITE THRESHOLD | 3866.4K | 405.29 |
| DM THRESHOLD | 0.00 | 0.00 |
| PAGE-INS REQUIRED FOR WRITE | 0.00 | 0.00 |

| LOCKING ACTIVITY | QUANTITY | /SECOND | /THREAD | /COMMIT |
|---|---|---|---|---|
| SUSPENSIONS (ALL) | 1498.6K | 69.57 | 9.02 | 3.02 |
| SUSPENSIONS (LOCK ONLY) | 33120.00 | 1.54 | 0.20 | 0.07 |
| SUSPENSIONS (IRLM LATCH) | 1405.3K | 65.24 | 8.45 | 2.83 |
| SUSPENSIONS (OTHER) | 60185.00 | 2.79 | 0.36 | 0.12 |
| ... | | | | |
| LOCK REQUESTS | 521.0M | 24.2K | 3134.34 | 1050.75 |
| UNLOCK REQUESTS | 478.1M | 22.2K | 2876.06 | 964.16 |
| QUERY REQUESTS | 50741.00 | 2.36 | 0.31 | 0.10 |
| CHANGE REQUESTS | 4488.4K | 208.38 | 27.00 | 9.05 |
| OTHER REQUESTS | 0.00 | 0.00 | 0.00 | 0.00 |

FIG. 14B

VIRTUAL DATABASE RESOURCE USAGE

BACKGROUND

Database technology has advanced significantly since it was introduced in the 1960s. In recent times, the volume of data that databases handle has grown exponentially, and thus, the performance of a database is important. Often, tradeoffs for performance are made, and how the database operates may be determined by various database parameters. The configuration parameter settings are important to database performance.

SUMMARY

A computer implemented method is provided for database performance testing and improvement. The method comprises using a processor of a database system (DBS) for embedding a virtual resource simulation system (VRSS) into a node of the DBS, loading a new configuration parameter of a database into the VRSS, receiving, by the VRSS from the DBS, an action control block (ACB), and dynamically activating and assigning a service task by a service task dispatcher of the VRSS to process the ACB. The method further comprises simulating a process of database execution based on a content of the ACB by creating a limited database internal data structure that is based on the ACB and the new configuration parameter, and manipulating the limited database internal structure in accordance with the ACB and the new configuration parameter to produce a simulation result. The method further comprises utilizing a metric associated with the simulation result of the new configuration parameter in the simulated process of database execution to improve database operations.

A computer implemented system is also provided for database performance testing and improvement. The system comprises a memory, and a processor that is configured to embed a virtual resource simulation system (VRSS) into a node of the DBS, load a new configuration parameter of a database into the VRSS, receive, by the VRSS from the DBS, an action control block (ACB), dynamically activate and assign a service task by a service task dispatcher of the VRSS to process the ACB. The processor is further configured to simulate a process of database execution based on a content of the ACB by having the processor create a limited database internal data structure that is based on the ACB and the new configuration parameter, and manipulate the limited database internal structure in accordance with the ACB and the new configuration parameter to produce a simulation result. The processor is further configured to utilize a metric associated with the simulation result of the new configuration parameter in the simulated process of database execution to improve database operations.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings:

FIGS. 14A and 14B are example screen printouts of values showing the result of the simulation against parameter adjustment, according to some embodiments.

DETAILED DESCRIPTION

The following acronyms may be used below:

TABLE 1

General Computer Acronyms

| | |
|---|---|
| API | application program interface |
| ARM | advanced RISC machine |
| CD-ROM | compact disc ROM |
| CMS | content management system |
| CoD | capacity on demand |
| CPU | central processing unit |
| CUoD | capacity upgrade on demand |
| DPS | data processing system |
| DVD | digital versatile disk |
| EPROM | erasable programmable read-only memory |
| FPGA | field-programmable gate arrays |
| HA | high availability |
| IaaS | infrastructure as a service |
| I/O | input/output |
| IPL | initial program load |
| ISP | Internet service provider |
| ISA | instruction-set-architecture |
| LAN | local-area network |
| LPAR | logical partition |
| PaaS | platform as a service |
| PDA | personal digital assistant |
| PLA | programmable logic arrays |
| RAM | random access memory |
| RISC | reduced instruction set computer |
| ROM | read-only memory |
| SaaS | software as a service |
| SLA | service level agreement |
| SRAM | static random-access memory |
| WAN | wide-area network |

Data Processing System in General

Figure 1A:
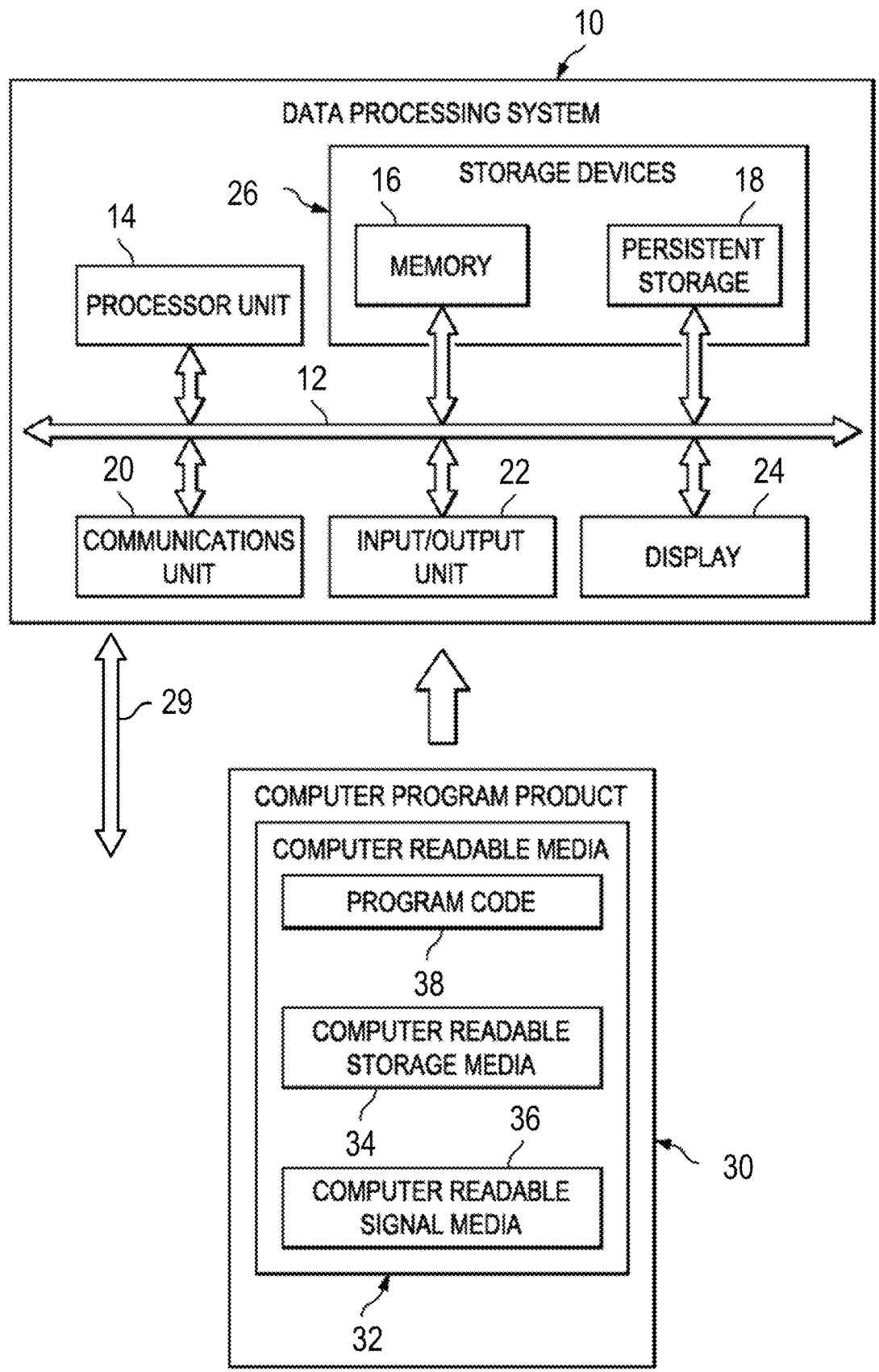
FIG. 1A is a block diagram of a data processing system (DPS) according to one or more embodiments disclosed herein.

FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
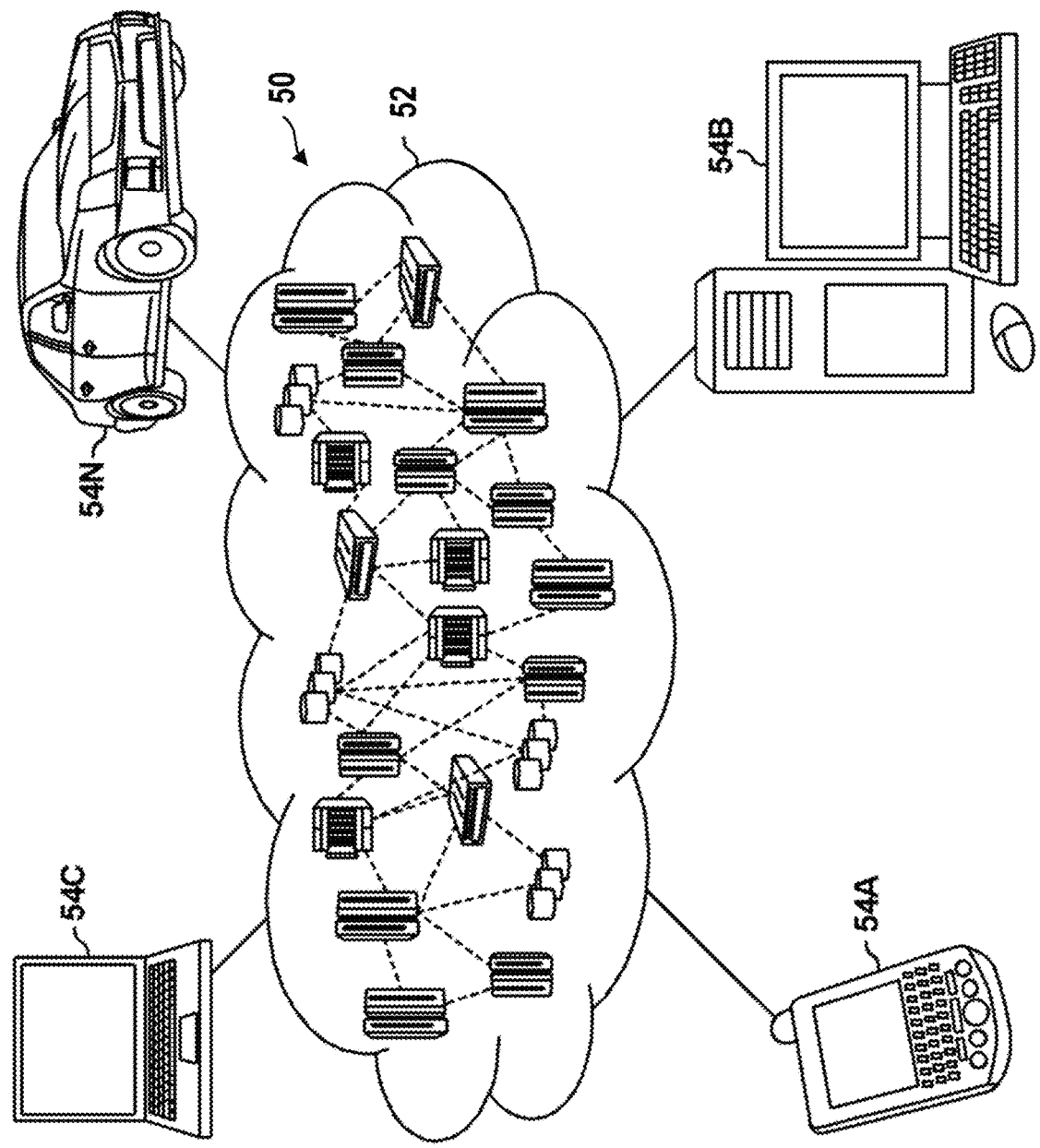
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
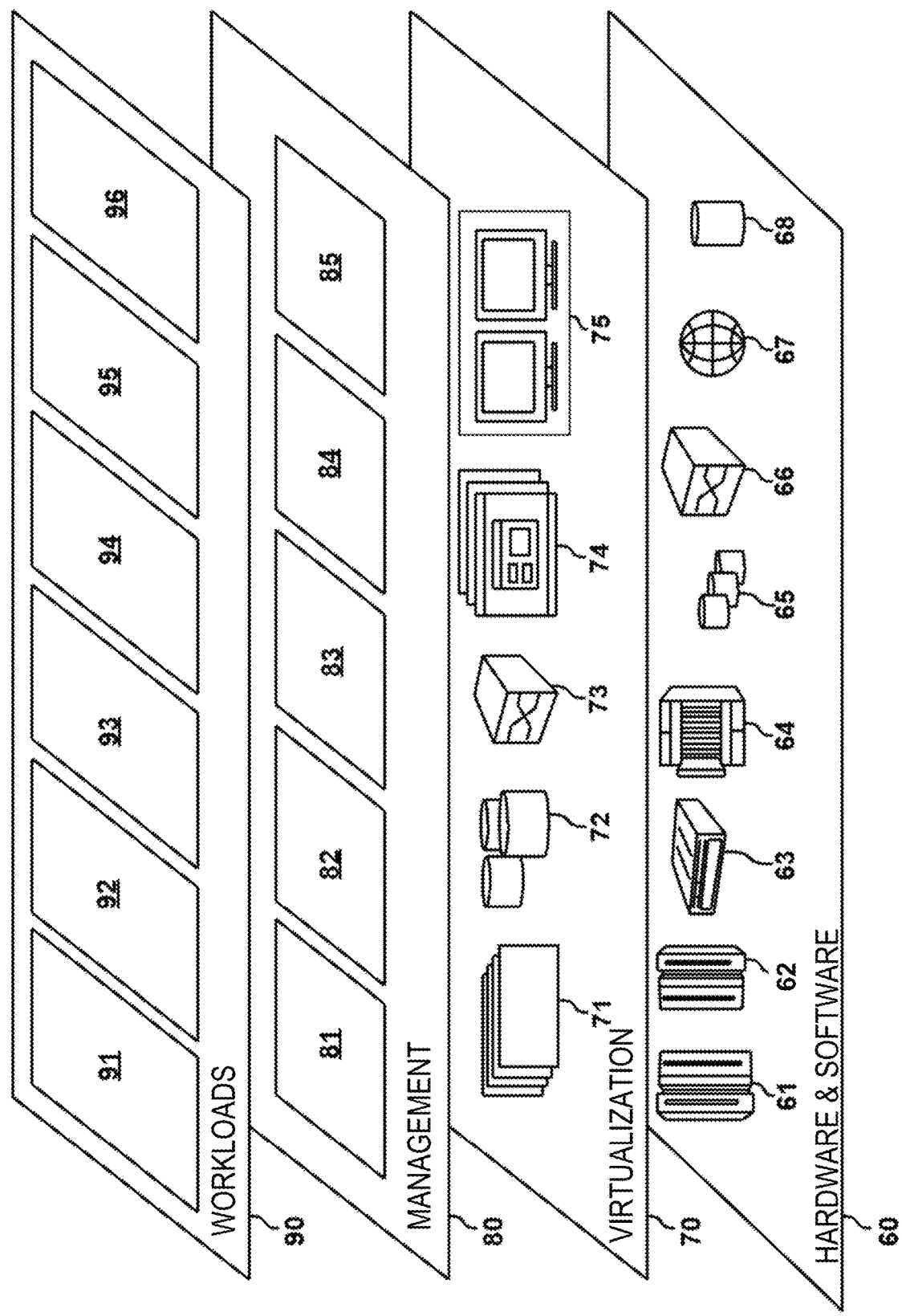
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application processing elements 96.

Any of the nodes 50 in the computing environment 52 as well as the computing devices 54A-N may be a DPS 10.
Computer Readable Media The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

TABLE 2

Application Specific Acronyms
VIRTUAL DATABASE RESOURCE USAGE

| | |
|---|---|
| ACB | action control block |
| SQL | structured query language |
| VRSS | virtual resource simulation (database) system |

Given the importance of database performance, tradeoffs in how the database operates may be determined by various database parameters. The configuration parameter settings can significantly impact database performance. However, it may provide difficult for users to understand actual meanings or impact of all the parameters, and it may further be difficult to foresee what latent problems may be encountered after a parameter is adjusted.

By way of illustrative example, the database parameter LOCKSIZE specifies the size of locks used within the table space and, in some cases, also the threshold at which a lock escalation occurs. It is not used for a table space in a work file database. The ANY parameter specified with the LOCKSIZE parameter specifies that the database DB2 may use any lock size. In most cases, the database DB2 uses LOCKSIZE PAGE LOCKMAX SYSTEM for non-LOB (non-large-object) table spaces and LOCKSIZE LOB LOCKMAX SYSTEM for LOB table spaces. However, when the number of locks acquired for the table space exceeds the maximum number of locks allowed for a table space (the NUMLKTS subsystem parameter), the page or LOB locks are released and locking is set at the next higher level of the database. If the table space is segmented, the next higher level in the database is the table. If the table space is segmented and not partitioned, the next higher level in the database is the table. If the table space is partitioned, the next higher level is the partition. If the table space is implicitly created, the database DB2 uses LOCKSIZE ROW.

Traditionally, in order to determine the effect of a parameter adjustment, another database system is created in a virtual environment (via a container), and the data is replicated to verify the effect after a parameter adjustment. However, this approach has drawbacks—it is inefficient and may consume many resources. Furthermore, a real production environment cannot be reflected, since all data in such an environment is masked for security purposes.

Figure 2:
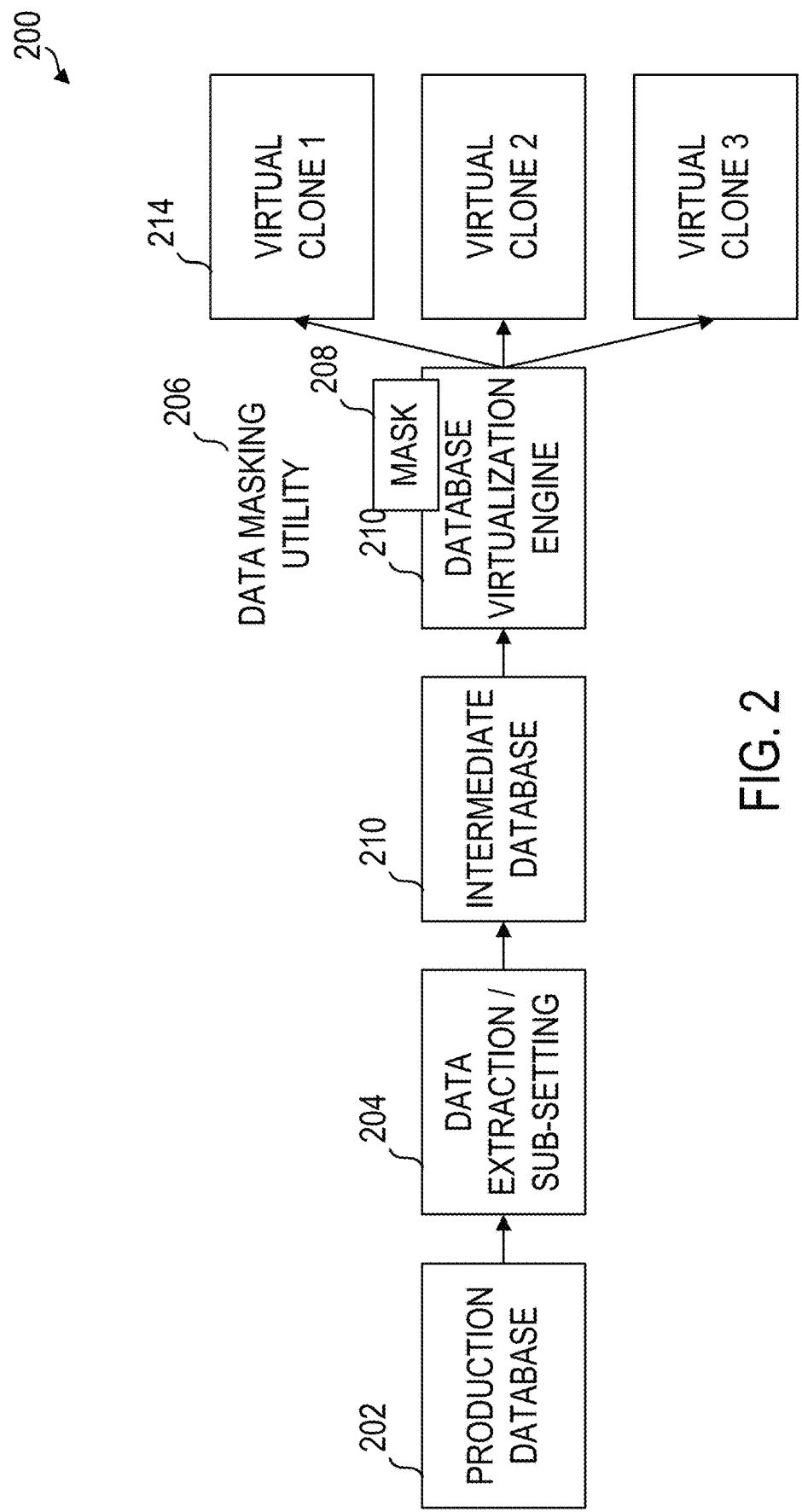
FIG. 2 is a block diagram that illustrates an example of a traditional approach of a non-production environment setup with data masking and virtual cloning.

FIG. 2 is a block diagram that illustrates an example of a traditional approach of a non-production environment 200 setup with data masking and virtual cloning. The production database 202 goes through a data extraction 204 with a sub-setting to produce an intermediate database 210—the intermediate database 210 has been masked 208 with a data masking utility 206. The intermediate database 210 is then processed by a database virtualization engine 212 into three separate virtual clones 214 of the database.

Performance testing is an important tool in database development. Ideally, the performance testing uses a real database. However, sometimes there are not enough resources available, causing developers to wait for the needed database performance test resources. Furthermore, the database may be huge, and taking a snapshot may, in addition to being efficient, cause the data to go stale, i.e., begin to vary from the actual database over the duration of the test.

The system and method disclosed herein provides for a virtual database resource whose benefits may be measured according to accounting resources and statistical resources. The approach described herein utilizes access paths that are simulated and that do not need significant database resources.

Advantageously, this approach may estimate the impact of one or more parameter changes on database performance. The database performance impact may be estimated in high efficiency and in real time. This approach may further avoid security-related issues, since no data needs to be replicated outside of the database. The embodiments disclosed herein may be applied to each node of a distributed relational database for performance effect simulation. Finally, embodiments disclosed herein may provide a way to assist in the autonomous maintenance of the database.

Figure 3:
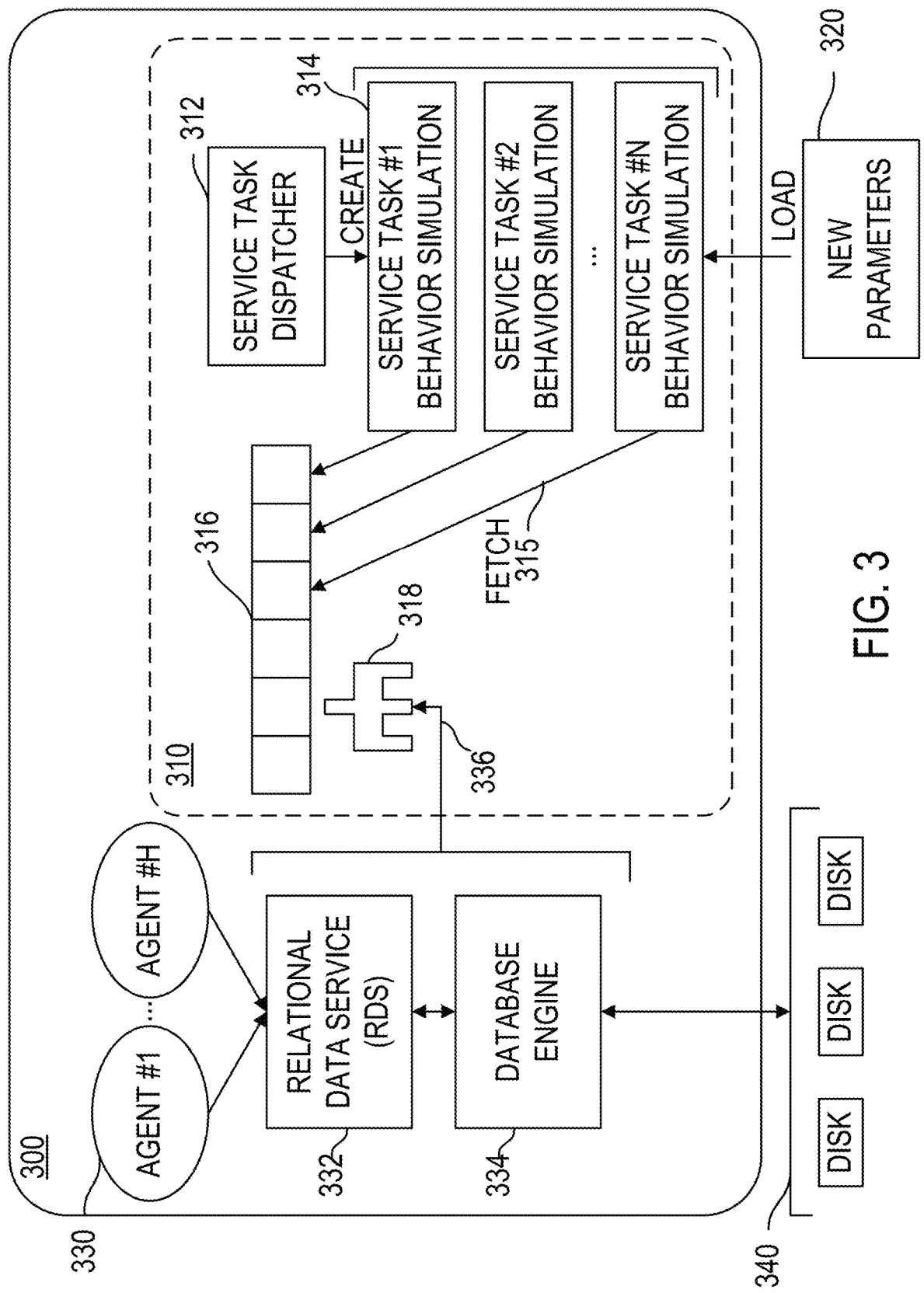
FIG. 3 is a block diagram that provides a high-level view of a database system, according to some embodiments.

FIG. 3 is a block diagram that provides a high-level view of a database system, according to some embodiments. The database system 300 and related methods are provided to verify whether the performance of a database system 300 may be improved after configuration parameters are adjusted. This verification may utilize virtual resource allocation and behavior simulation in order to avoid the overhead associated with testing in a potentially huge environment. In some embodiments, the database system 300 may operate within the cloud 50 and utilize a database server. Such a server may, in some embodiments be implemented on a DPS 10.

In some embodiments, a new virtual resource simulation (database) system (VRSS) 310 is introduced and embedded in the database system 300. The VRSS 310 may be a part of the application processing elements 96. The latest configuration (new) parameters 320 of the database are loaded into the VRSS 310 for new execution behavior simulation. A service task dispatcher 312 may create service tasks 314 that fetch 315 and process action control blocks (ACBs) 336 from an action queue 316. The ACBs 336 are created by agents 330 issuing commands to a relational data service 332 that interfaces to a database engine 334 that is ultimately responsible for interfacing with the database itself stored on a non-volatile storage medium, such as a disk. The commands trigger the creation of the ACBs 336 that are sent asynchronously to a pipe 318 in which they are sorted prior to entry in the action queue 316.

The design of the VRSS 310 is such that it shares data with the actual running database system 300 and uses live data—not copied or simulated data. However, in doing so, the VRSS 310 is designed such that it minimizes the impact on the actual running database system 300 by not interfering with normal database operations. One area where this interference by the VRSS 310 could become problematic is in putting locks on parts of the real database for access purposes. An aim of the VRSS 310 noted above is to determine the impact of one or more parameter changes for the database, and thus, a mechanism for logging or saving information related to the running of the VRSS 310 is kept. Although it is possible to record the activities in terms of time, it is more beneficial to record the activities in terms of numbers of instructions. This is because the VRSS 310 may use a different CPU or may be impacted by other variables or differences in from the operation of the actual database system 300. Thus, a change in the number of instructions is more meaningful than the actual running time on the VRSS 310. How this may be achieved is described in more detail below.

FIGS. 4-15 provide a more detailed elaboration of the database system 300.

Figure 4:
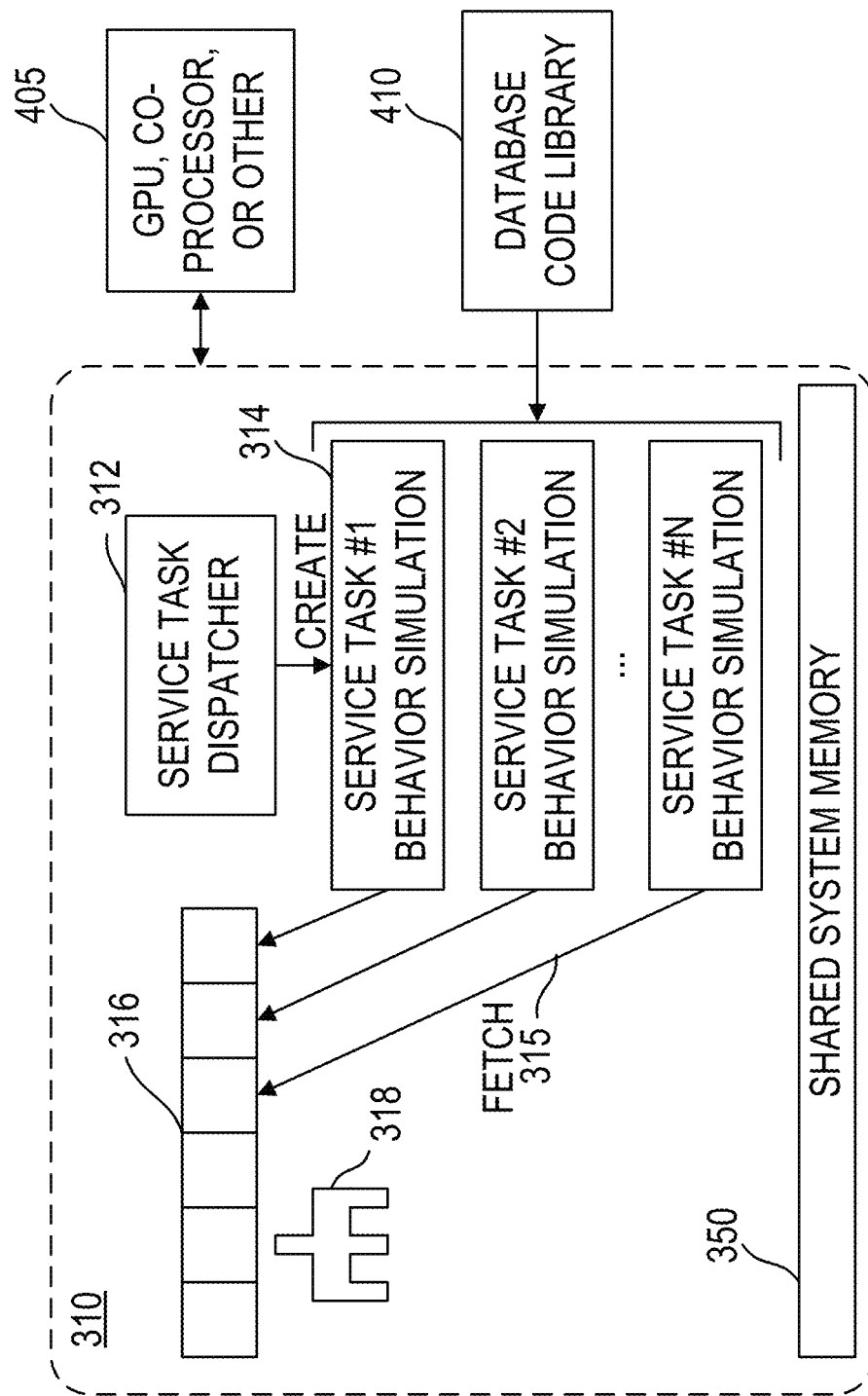
FIG. 4 is a block diagram of the database system illustrating the introduction of the VRSS into the database server, according to some embodiments.

FIG. 4 is a block diagram of the database system 300 illustrating the general architecture and introduction of the VRSS 310 into the database server. The VRSS 310 may use a single CPU 405 (such as a coprocessor, a GPU, etc.), but share system memory 350 (in a very limited manner), data, and a code library 410 with the database system 300. The database code library 410 may be used to extend and customize the service tasks 314 that are created by the service task dispatcher 312 in the VRSS 310, in some embodiments, one per each ACB 336 in the action queue 316. Some parts of the database code library 410 may be shared with the actual database system 300, but some parts may be unique to the VRSS 310.

Figure 5:
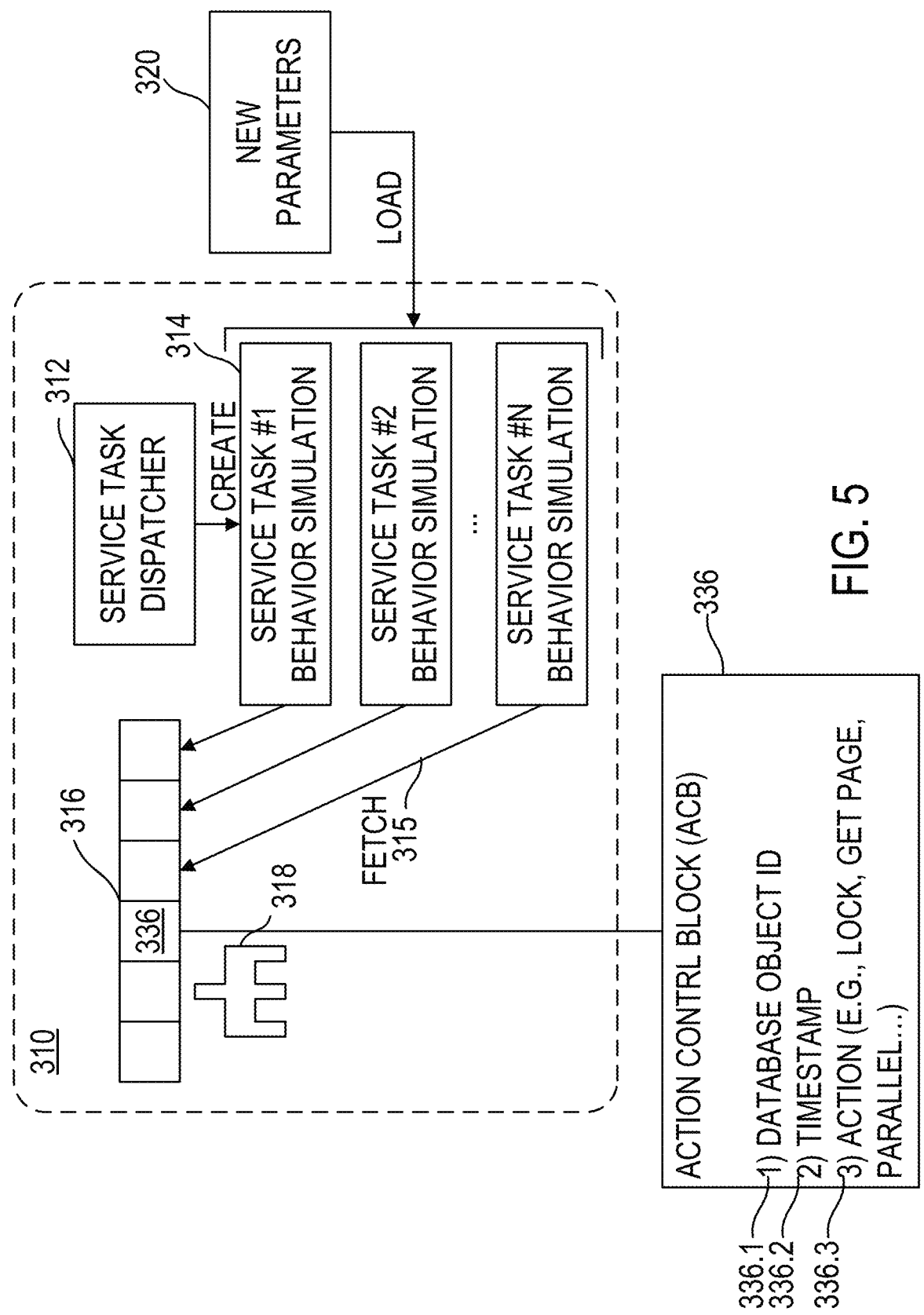
FIG. 5 is a block diagram of the database system illustrating a loading of the new parameters that are to be used by the service tasks for the new execution behavior simulation by the VRSS, according to some embodiments.

FIG. 5 is a block diagram of the database system 300 illustrating a loading of the new parameters 320 that are to be used by the service tasks 314 for the new execution behavior simulation by the VRSS 310. Once the VRSS 310 determines a configuration parameter is changed (besides a normal SQL execution process), the ACB 336 is generated in terms of the type of parameter modified and sent to the pipeline 318 of the action queue 316 asynchronously. The ACB 336 may comprise a database object ID 336.1, which may be used to simulate and monitor a particular action, a timestamp 336.2, and an action 336.3, such as lock, get page, parallel, etc. Even though the configuration parameters are changed for the VRSS 310, the production system still follows the original behavior for the unmodified parameter change.

Figure 6:
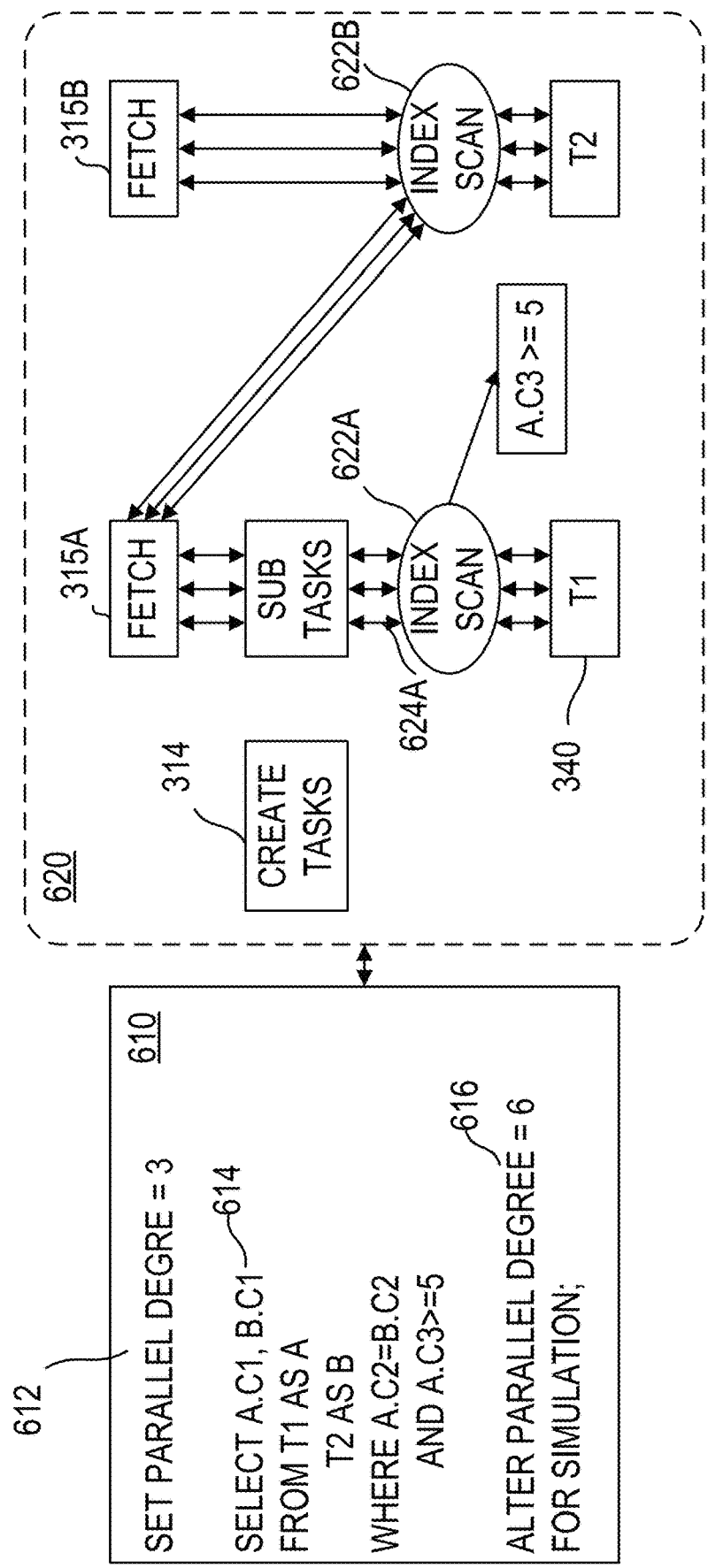
FIG. 6 is a block diagram illustrating an example for simulating an SQL parallel operation after a configuration parameter related with the parallel degree is changed, according to some embodiments.

FIG. 6 is a block diagram illustrating an example for simulating an SQL parallel operation after a configuration parameter related with the parallel degree is changed. A degree of parallelism represents the number of parallel execution servers associated with a single operation and may be (but not necessarily be) chosen by the user. As shown in the listing 610, the parallel degree is initially set to three 612 for executing the SQL statement 614. The SQL statement 614 performs a search between two tables T1 (as A in the SQL statement) and T2 (as B in the SQL statement), and provides a hit when a value in column two (C2) of each table is the same, and a third column (C3) is greater than or equal to five. However, it is desired to determine the impact of altering the parallel degree from three parallel paths 624A to six for the simulation 616 for the VRSS 310 when executing the SQL statement 614 using the index scan 622A. An access path 620 receives the listing 610, including the SQL statement 614.

Figure 7:
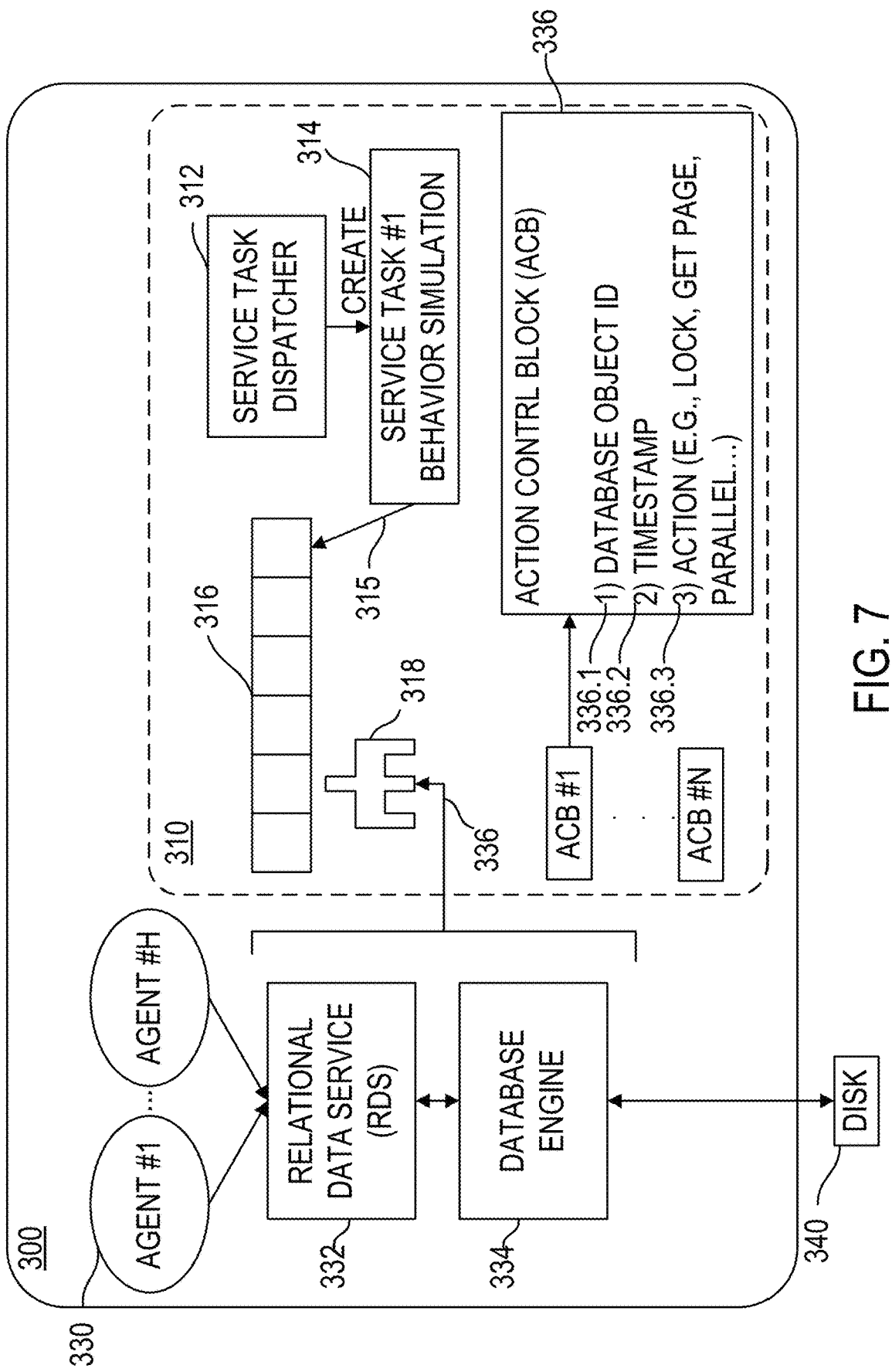
FIG. 7 is a block diagram illustrating the sending of the ACB to the action queue by the relational data service in order to simulate SQL parallel execution in the VRSS under the new configuration parameters, according to some embodiments.

FIG. 7 is a block diagram illustrating the sending of the ACB 336 to the action queue 316 by the relational data service 332 in order to simulate SQL parallel execution in the VRSS 310 under the new configuration parameters (here, parallel degree is six). There may be a one-to-many relationship between the agent SQL and the ACBs 336. By way of example, the database object ID 336.1 may be an SQL ID that is used to locate/access the task, and the action 336.3 may be "parallel".

Figure 8:
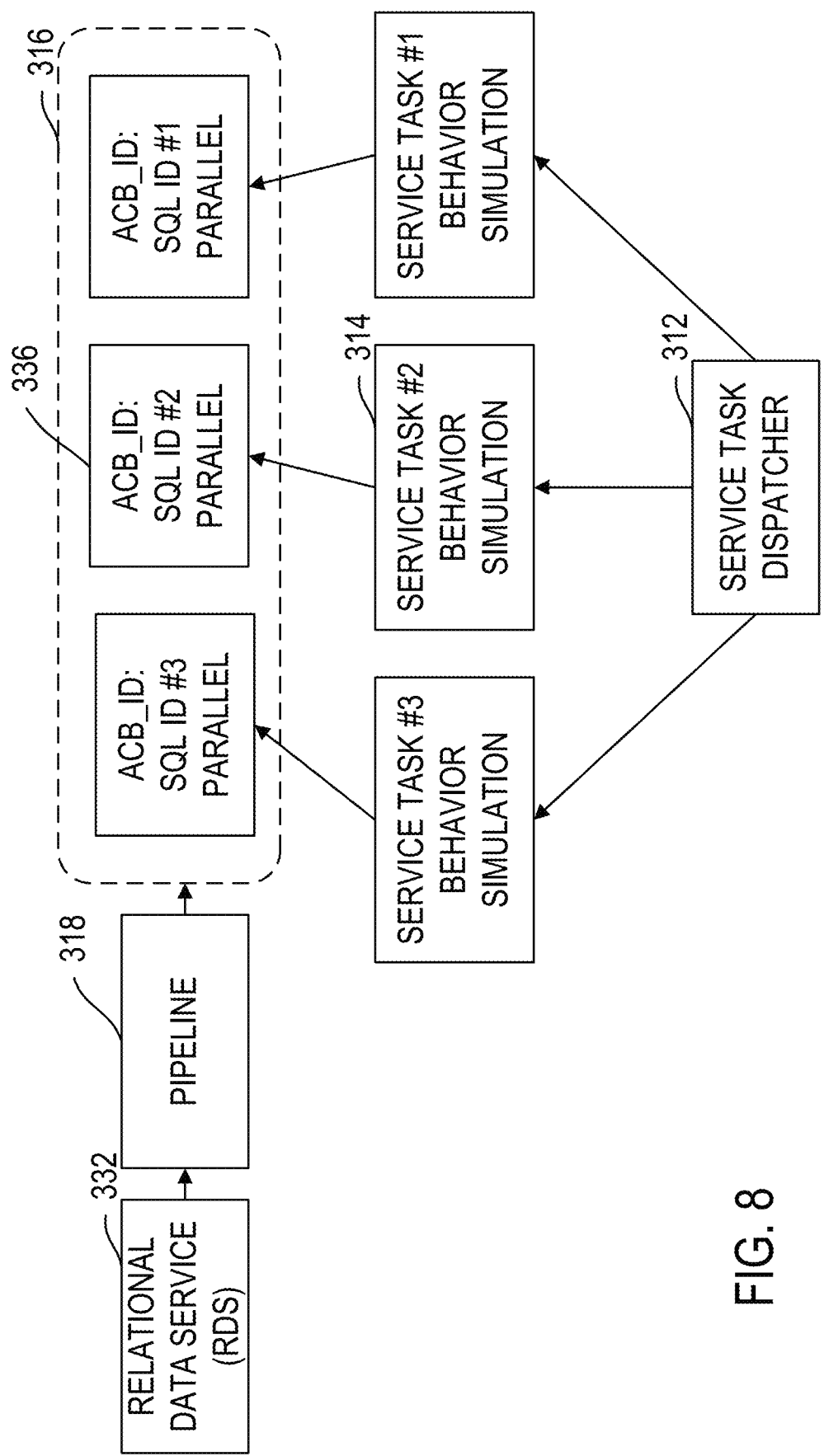
FIG. 8 is a block diagram illustrating the action queue and the service task dispatcher for the above example, according to some embodiments.

FIG. 8 is a block diagram illustrating the action queue 316 and the service task dispatcher 312 for the above example. The relational data service 332 sends 3 ACBs 336 to the pipeline 318 that performs the sorting function prior to the ACBs 336 being put into the action queue 316. The service task dispatcher 312 starts three separate service tasks 314 for the simulation corresponding to each of the three ACBs 336. Use of an ACB ID in the ACBs makes them lightweight since the ACB ID may serve as a reference to additional information as opposed to actually containing the additional information.

Figure 9:
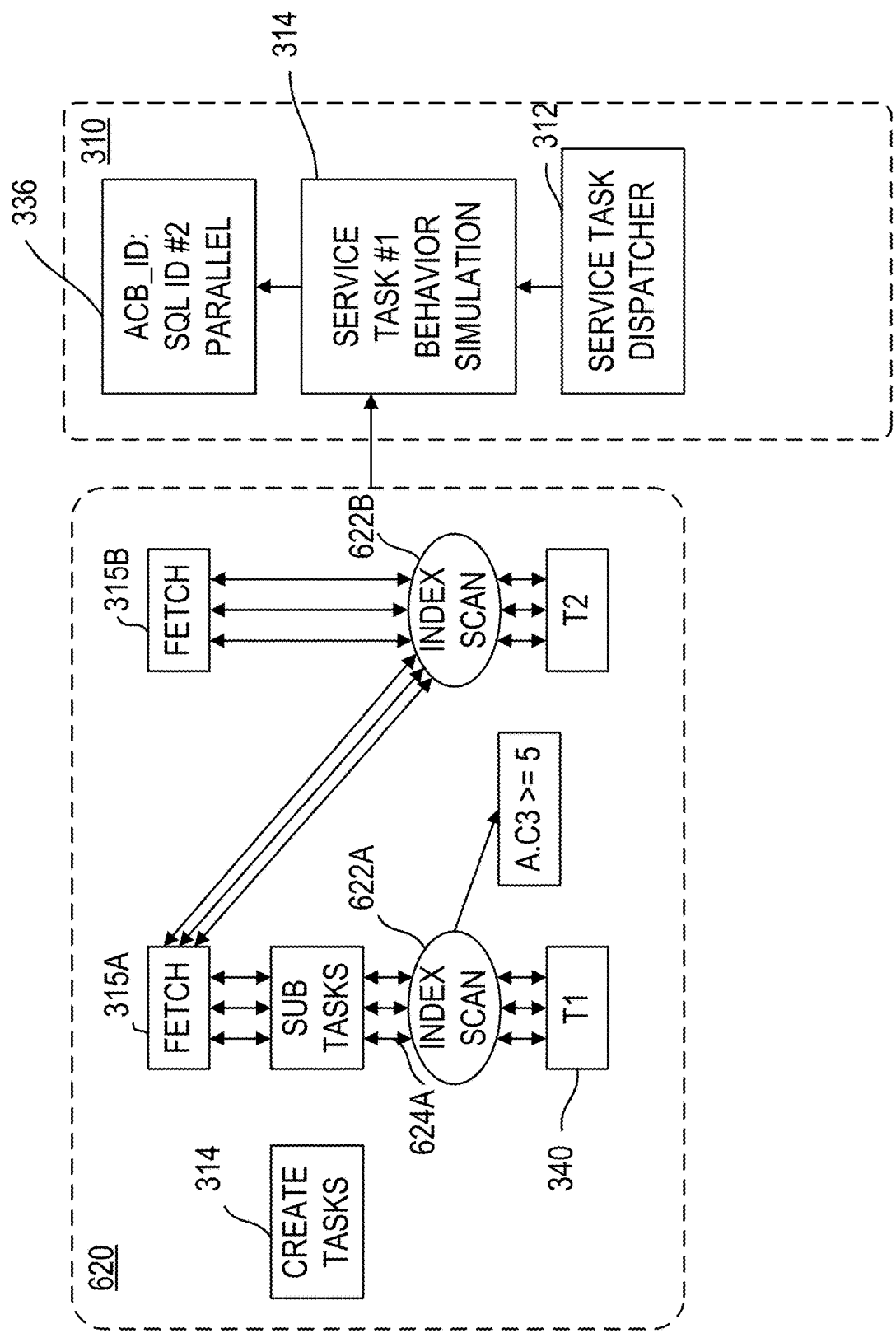
FIG. 9 is a block diagram illustrating resolution of an ACB, according to some embodiments.

FIG. 9 is a block diagram illustrating resolution of an ACB 336. The service task 314 resolves an ACB 336 and loads the access path 620 (to the shared memory/data) according to an SQL ID from a database catalog table 910 into the VRSS 310 for dummy execution. Using the mechanisms described above means that the VRSS 310 is a very lightweight resource, i.e., it uses a very small amount of shared memory/data and other resources. The VRSS 310 may, for operations, make use of shared code from the database code library 410.

Figure 10A:
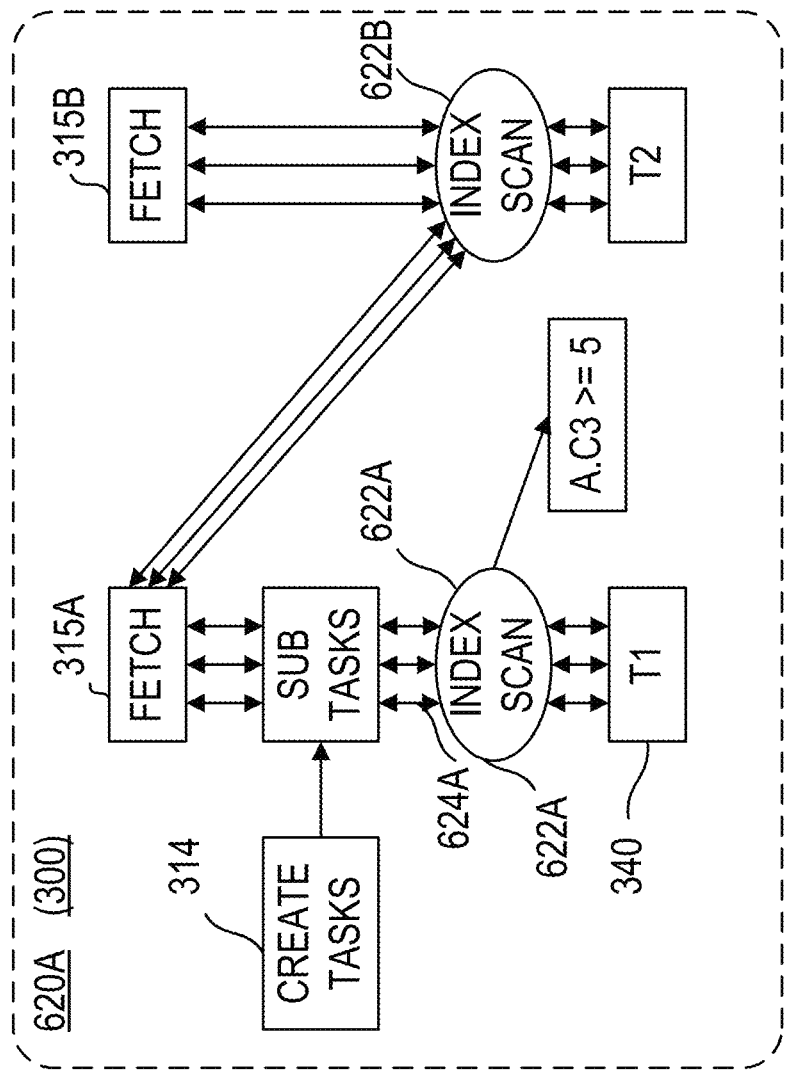
FIGS. 10A and 10B are block diagrams that illustrate an SQL parallel execution in the database system and the VRSS, according to some embodiments.
Figure 10B:
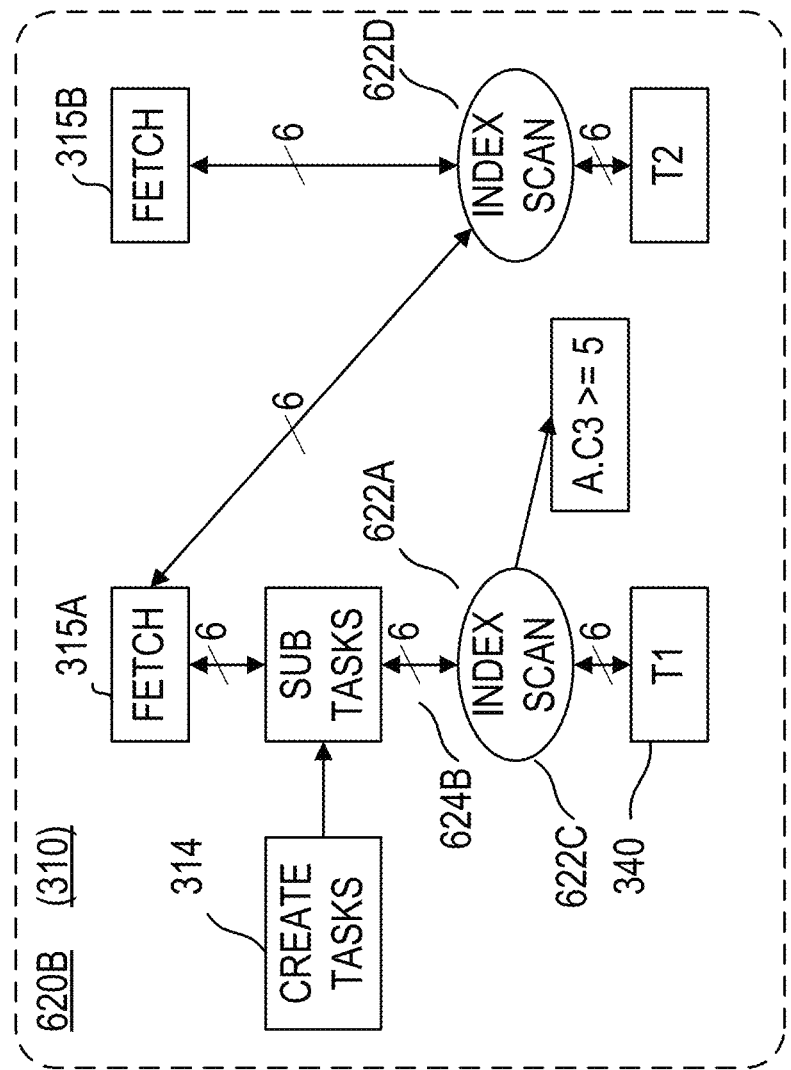

FIGS. 10A and 10B are block diagrams that illustrate an SQL parallel execution in the database system 300 and the VRSS 310. FIG. 10A is similar to FIG. 6, and shows an execution 620A within the database system 300. Note the sets of three lines 624A interconnecting the elements, which corresponds to the parallel degree being three. FIG. 10B is similar to FIGS. 6 and 10A, however, it reflects execution 620B on the VRSS 310. Note the sets of six lines 624B interconnecting the elements, which corresponds to the parallel degree being six. As can be seen in FIG. 10B, the index scan accesses the real index and tables in the database system 300 since the VRSS 310 does not contain any real data. This is simple for the VRSS 310 to do, due to use of the shared database code library 410.

Figure 11:
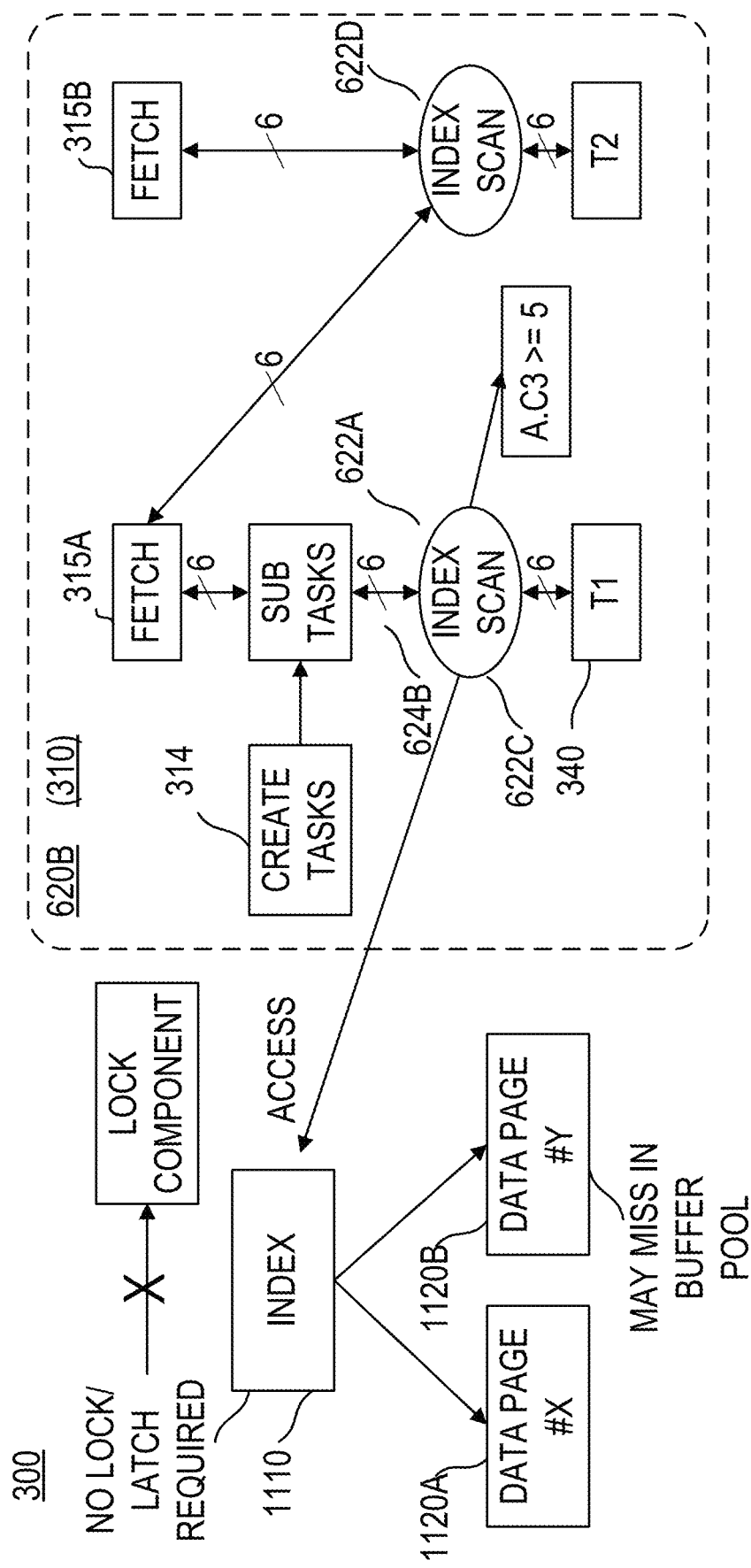
FIG. 11 is a block diagram illustrating an access aspect of the VRSS, according to some embodiments.

FIG. 11 is a block diagram illustrating an access aspect of the VRSS 310 for how to minimize the impact on the running database system 300. The VRSS 310 accesses data from the database system 300, including the index 1110, and data pages 1120A, 1120B, 1120C of the tables 340 (data pages) via a read command. However, this read is performed in an "uncommitted read" mode which avoid creating a block on the table. It is possible, however, that this read, e.g., on a second page 1120B incurs a miss in the buffer pool. The VRSS 310 estimates a cost if the index and/or data page is missed in the buffer pool.

Figure 12A:
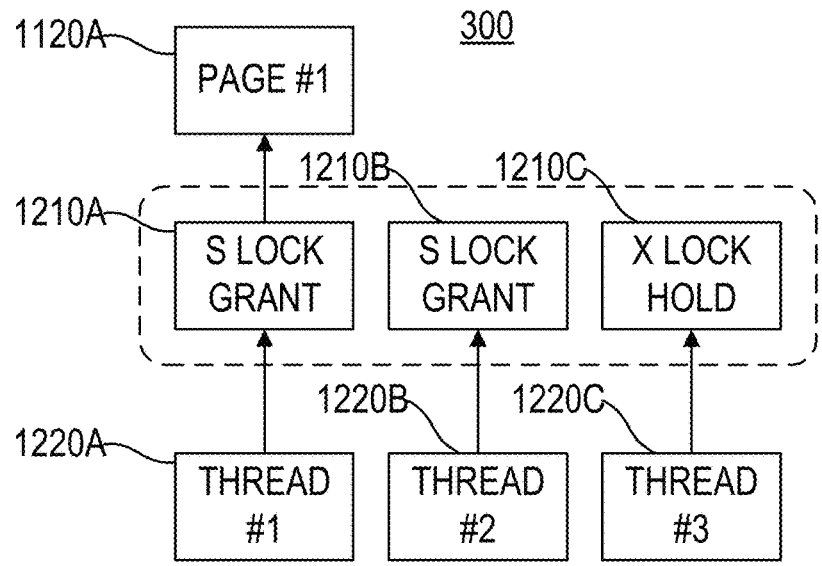
FIGS. 12A and 12B are block diagrams illustrating a database lock for the database and the VRSS, according to some embodiments.
Figure 12B:
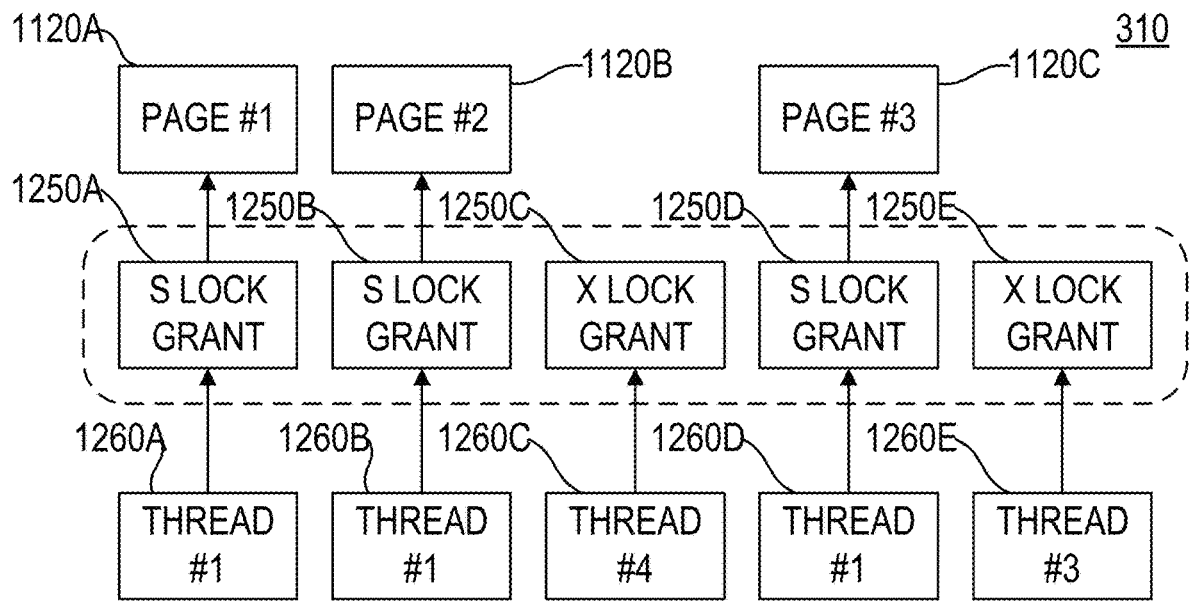

FIGS. 12A and 12B are block diagrams illustrating a database lock for the database 300 and the VRSS 310. After the service task 314 creates the simulation in the VRSS 310, the database internal structure is as follows. In FIG. 12A, in the database 300 with the parallel degree being three, the first thread 1220A requests a shared lock 1210A (read/select), for access to the first page 1120A, the second thread 1220B requests a shared lock 1210B (read/select), and the third thread 1220C requests an exclusive lock 1210C (write/update).

In FIG. 12B, in the VRSS 310 with the parallel degree being six, the first thread 1260A requests a shared lock 1250A (read) for access to the first page 1120A, the second thread 1260B requests a shared lock 1250B (read), and the third thread 1260C requests an exclusive lock 1250C (write/update) for access to the second page 1120B, the fourth thread 1260D requests a shared lock 1250D (read), and the fifth thread 1260E requests an exclusive lock 1250E (delete) for access to the third page 1120C. The parallel degree being three in the database 300 of FIG. 12A has a lower CPU cost, but a lower concurrency. The parallel degree being six in the VRSS 310 of FIG. 12B has a higher CPU cost, but a higher concurrency.

The VRSS 310 creates its own internal lock structure to avoid creating locks that might interfere with access in the real database system 300. It is not important in the VRSS 310 whether the actual data being returned is accurate or not (i.e., without proper locking, some of the data may be out of sync)—the concern is simply the performance in accessing the data. Therefore, the VRSS 310 does not do a lock in the real production environment (the database system 300), but rather uses its own internal dummy locks. Also, the VRSS 310 is not effective when the commands include write commands, since the proper write locks cannot be employed without impacting the database system 300.

Figure 13:
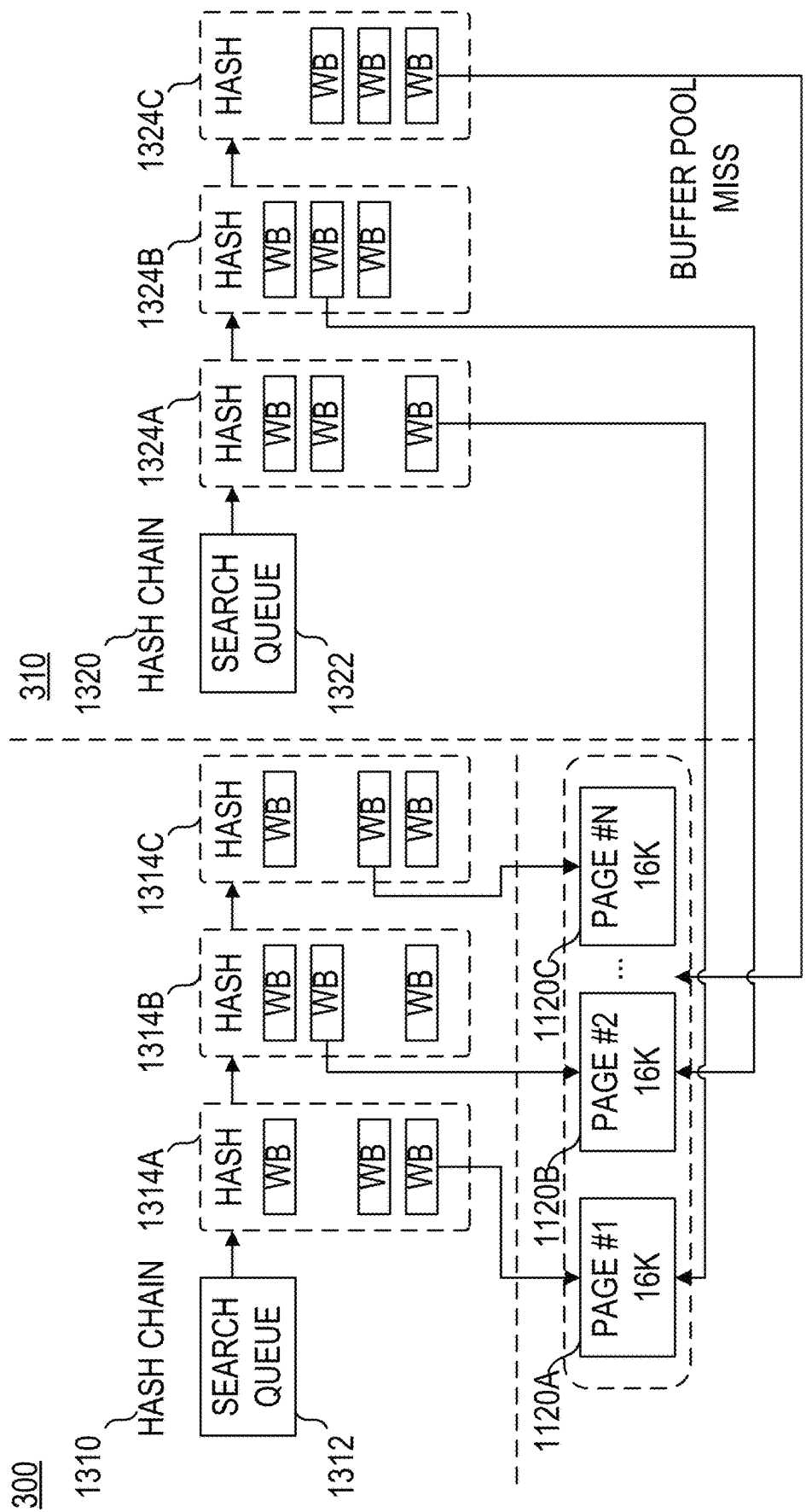
FIG. 13 is a block diagram illustrating a difference in the buffer pool structure between the database and the VRSS, according to some embodiments.

FIG. 13 is a block diagram illustrating a difference in the buffer pool structure between the database 300 and the VRSS 310. This figure shows the performance impact from a buffer pool perspective, vs. the lock perspective discussed above. With respect to the database 300, a hash chain 1310 is created based on the results of a search queue 1312. Each hash 1314A, 1314B, 1314C relates respectively to respective pages 1120A, 1120B, 1120C, each of which are 16K, in the buffer pool. The windows block (WB) is utilized to monitor the page, and corresponding structures are provided in the VRSS 310 for those in the database system 300). The buffer pool in the database may have, as illustrated in the example, 3.2 GB allocated to it. For the VRSS 310, a similar structure exists. The hash chain 1320 is created based on the results of a search queue 1322. Each hash 1324A, 1324B, 1324C relates respectively to respective pages 1120A, 1120B, 1120C, each of which are 16K, in the buffer pool. In both cases, the internal hash structures have a total size of 4 MB. The VRSS 310 utilizes asynchronous I/O if it cannot access the data in the system database 300. As noted above, if there are a lot of writes coming in, the VRSS 310 is not so accurate since it cannot actually simulate the writes without impacting the system database 300. The performance report may include an entry that identifies the number or ratio of writes to qualify the accuracy of the report.

FIGS. 14A and 14B are example screen printouts of values showing the result of the simulation against parameter adjustment. FIG. 14A shows various parameters provided by a database monitor/trace output that relate to the buffer pool. The effects of the parameter change are thus quantified in the various aspects shown. FIG. 14B is similar to FIG. 14A, but shows the effects of the parameter change that relate to locking activity.

Figure 15:
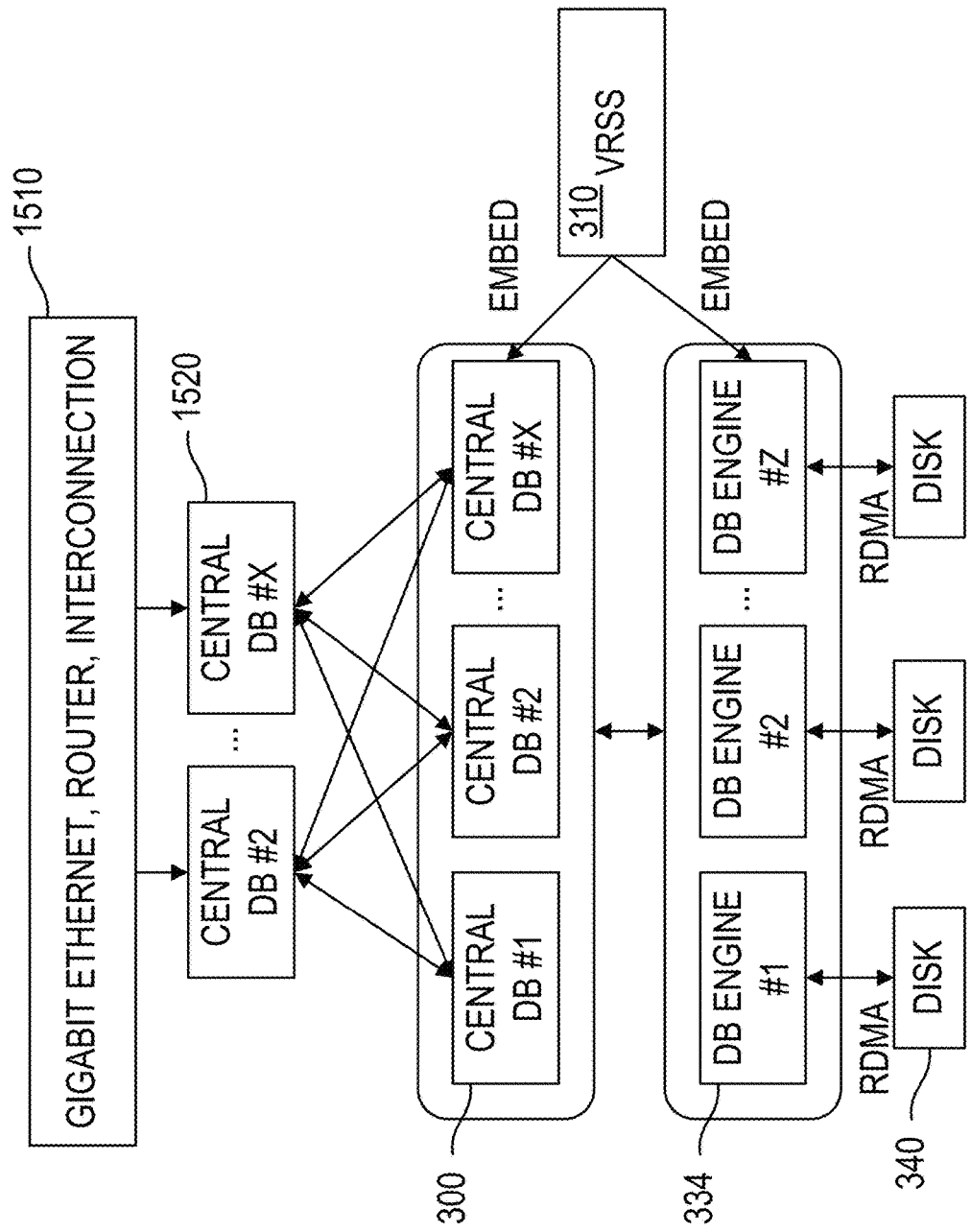
FIG. 15 is a block diagram illustrating the application of various embodiments to each node of a distributed relational database, according to some embodiments.

FIG. 15 is a block diagram illustrating the application of various embodiments to each node of a distributed relational database. Networking components 1510, such as a gigabit ethernet, router, or other interconnecting aspects, tie together a plurality of servers 1520 and may implement a plurality of different databases 300. The VRSS 310 may be embedded in each of the databases 300 and utilize respective database engines 334 that are interfaced with a physical storage 340 hosting the database 300.

Figure 16:
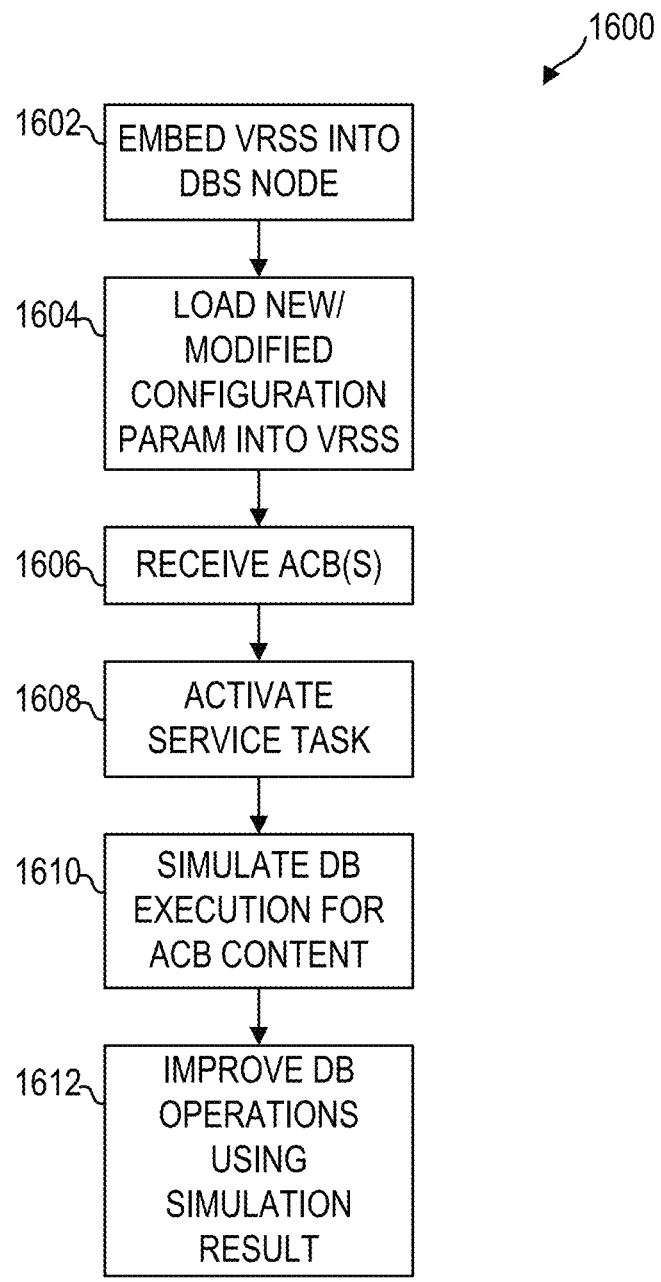
FIG. 16 is a flowchart illustrating a process that may be used herein, according to some embodiments.

FIG. 16 is a flowchart illustrating a process 1600 that may be used herein according to some embodiments. In operation 1602, a VRSS 310 is embedded into a DBS 300 node. New or modified configuration parameters are loaded into the VRSS 310, and, in operation 1606, ACBs 336 are received by the VRSS 310. In operation 1608, the service task dispatcher 312 activates service tasks 314 that are associated with the ACBs 336 from the action queue 316. In operation 1610, the VRSS 310 simulates database execution for the ACB 336 content. In operation 1612, results of the simulated database execution are used to improve database operations.

TECHNICAL APPLICATION

The one or more embodiments disclosed herein accordingly provide an improvement to computer technology. For example, an improvement in determining an effect of a database parameter change allows for a more efficient operation of a computer database.

What is claimed is:
1. A computer implemented method for database performance testing and improvement, comprising, using a processor of a database system (DBS):
  embedding a virtual resource simulation system (VRSS) into a node of the DBS;
  loading a new configuration parameter of a database into the VRSS;
  receiving, by the VRSS from the DBS, an action control block (ACB);
  dynamically activating and assigning a service task by a service task dispatcher of the VRSS to process the ACB;
  simulating a process of database execution based on a content of the ACB by:
    creating a limited database internal data structure that is based on the ACB and the new configuration param- eter wherein the limited database internal data structure is a lock structure; and manipulating the limited database internal structure in accordance with the ACB and the new configuration parameter to produce a simulation result; and utilizing a metric associated with the simulation result of the new configuration parameter in the simulated process of database execution to improve database operations.

2. The method of claim 1, wherein:
the ACB is a plurality of ACBs; and
sending ACBs to a pipeline of an action queue asynchronously.

3. The method of claim 2, further comprising sorting the ACBs in a pipeline of the VRSS prior to sending the ACBs to the action queue.

4. The method of claim 3, wherein the sorting is based on an object ID and a timestamp of the ACBs.

5. The method of claim 1, further comprising:
loading an access path from a catalog table of the DBS into the VRSS; and
using the access path by the VRSS when executing the ACB to access an index and tables in the database.

6. The method of claim 1, further comprising performing the simulation of the process of database execution corresponding to the simulating of the process on the DBS in parallel with the simulating of the process using an unmodified configuration parameter corresponding to a modified configuration parameter.

7. The method of claim 1, wherein:
the ACB is associated with a structured query language (SL) query.

8. The method of claim 1, wherein:
the DBS is a distributed DBS; and
an instance of a VRSS is embedded into each node of the distributed DBS.

9. The method of claim 1, wherein the configuration parameters are runtime configuration parameters that are associated with an operation selected from the group consisting of locking, buffer pool operations, sorting, and parallel operations.

10. The method of claim 1, wherein the VRSS uses a single CPU but shares system memory, data, and a code library with the DBS.

11. The method of claim 1, further comprising:
detecting, by the DBS, a modified configuration parameter;
generating a further action control block (ACB) based on the modified configuration parameter; and
sending the ACB to a pipeline of an action queue asynchronously.

12. A computer implemented system for database performance testing and improvement, comprising:
a memory; and
a processor that is configured to:
embed a virtual resource simulation system (VRSS) into a node of the DBS;
load a new configuration parameter of a database into the VRSS;
receive, by the VRSS from the DBS, an action control block (ACB);
dynamically activate and assign a service task by a service task dispatcher of the VRSS to process the ACB;
simulate a process of database execution based on a content of the ACB by having the processor:

create a limited database internal data structure that is based on the ACB and the new configuration parameter wherein the limited database internal data structure is a lock structure; and
manipulate the limited database internal structure in accordance with the ACB and the new configuration parameter to produce a simulation result; and
utilize a metric associated with the simulation result of the new configuration parameter in the simulated process of database execution to improve database operations.

13. The system of claim 12, wherein:
the ACB is a plurality of ACBs; and
the processor is further configured to send the ACBs to a pipeline of an action queue asynchronously.

14. The system of claim 13, wherein the processor is further configured to sort the ACBs in a pipeline of the VRSS prior to the send of the ACBs to the action queue.

15. The system of claim 14, wherein the sort is based on an object ID and a timestamp of the ACBs.

16. The system of claim 12, wherein the processor is further configured to:
load an access path from a catalog table of the DBS into the VRSS; and
use the access path by the VRSS when executing the ACB to access an index and tables in the database.

17. The system of claim 12, wherein the processor is further configured to perform the simulation of the process of database execution corresponding to the simulation of the process on the DBS in parallel with the simulation of the process using an unmodified configuration parameter corresponding to a modified configuration parameter.

18. A computer program product for an expiring virtual currency apparatus, the computer program product comprising:
one or more computer readable storage media, and program instructions collectively stored on the one or more computer readable storage media, the program instructions comprising program instructions to:
embed a virtual resource simulation system (VRSS) into a node of the DBS;
load a new configuration parameter of a database into the VRSS;
receive, by the VRSS from the DBS, an action control block (ACB);
dynamically activate and assign a service task by a service task dispatcher of the VRSS to process the ACB;
simulate a process of database execution based on a content of the ACB by:
create a limited database internal data structure that is based on the ACB and the new configuration parameter wherein the limited database internal data structure is a lock structure; and
manipulate the limited database internal structure in accordance with the ACB and the new configuration parameter to produce a simulation result; and
utilize a metric associated with the simulation result of the new configuration parameter in the simulated process of database execution to improve database operations.

19. The computer program product of claim 18, wherein:
the ACB is associated with a structured query language (SL) query;
the DBS is a distributed DBS;
an instance of a VRSS is embedded into each node of the distributed DBS; and the configuration parameters are runtime configuration parameters that are associated with an operation selected from the group consisting of locking, buffer pool operations, sorting, and parallel operations.

20. The computer program product of claim 18, wherein:

the VRSS uses a single CPU but shares system memory, data, and a code library with the DBS; and the instructions further cause the processor to:

detect, by the DBS, a modified configuration parameter;

generate a further action control block (ACB) based on the modified configuration parameter; and send the ACB to a pipeline of an action queue asynchronously.

* * * * *